(12) United States Patent
Woelfling

(10) Patent No.: US 10,166,932 B2
(45) Date of Patent: Jan. 1, 2019

(54) BICYCLE MOUNT DEVICE

(71) Applicant: Robert Joseph Woelfling, Pilesgrove, NJ (US)

(72) Inventor: Robert Joseph Woelfling, Pilesgrove, NJ (US)

(*) Notice: Subject to any disclaimer, the term of this patent is extended or adjusted under 35 U.S.C. 154(b) by 0 days.

(21) Appl. No.: 15/878,859

(22) Filed: Jan. 24, 2018

(65) Prior Publication Data

US 2018/0147997 A1    May 31, 2018

Related U.S. Application Data

(63) Continuation-in-part of application No. 14/840,131, filed on Aug. 31, 2015.

(60) Provisional application No. 62/045,210, filed on Sep. 3, 2014.

(51) Int. Cl.
*B60R 9/10* (2006.01)
*B60R 9/06* (2006.01)

(52) U.S. Cl.
CPC . *B60R 9/10* (2013.01); *B60R 9/06* (2013.01)

(58) Field of Classification Search
CPC .................................. B60R 9/10; B60R 9/06
USPC ........................................................ 224/567
See application file for complete search history.

(56) References Cited

U.S. PATENT DOCUMENTS

| | | |
|---|---|---|
| 619,376 A | 2/1899 | White |
| 3,981,491 A | 9/1976 | Snyder |
| 4,219,142 A | 8/1980 | Macpherson |
| 4,934,572 A | 6/1990 | Bowman et al. |
| 5,108,018 A | 4/1992 | Spinka |
| 5,709,521 A * | 1/1998 | Glass ...................... B60R 9/042 224/310 |
| 5,765,821 A | 6/1998 | Janisse et al. |
| 5,779,119 A | 7/1998 | Talbot et al. |
| 6,435,523 B1 | 8/2002 | Hilk |
| 6,616,022 B1 | 9/2003 | Naastad |
| 6,648,148 B1 | 11/2003 | Bally |
| 7,712,614 B2 | 5/2010 | Carlson et al. |
| 2003/0102343 A1* | 6/2003 | Anderson ................. B60R 9/06 224/536 |
| 2004/0065707 A1 | 4/2004 | Haagstad |
| 2005/0056740 A1* | 3/2005 | Chuang ................ B25H 1/0014 248/176.1 |

FOREIGN PATENT DOCUMENTS

GB           2467558 A       8/2010

* cited by examiner

*Primary Examiner* — Derek Battisti

(74) *Attorney, Agent, or Firm* — Saxton & Stump, LLC

(57) ABSTRACT

A device for mounting a bicycle, regardless of the positioning of the top cross-bar, to a bicycle rack, the device includes a bicycle attachment member, a mounting member, and a connection member. The bicycle attachment member is dimensioned to cooperate with a seat positioning member of the bicycle to secure the bicycle attachment member to the seat positioning member. The mounting member extends at an angle relative to the bicycle attachment member. The connection member connects the bicycle attachment member to the mounting member, wherein the bicycle is maintained in level position on the bicycle rack during transport.

17 Claims, 8 Drawing Sheets

BICYCLE MOUNT DEVICE

CROSS-REFERENCE TO RELATED APPLICATION

The Application claims benefit from and is a Continuation-in-Part Application of U.S. Nonprovisional patent application Ser. No. 14/840,131 filed Aug. 31, 2015 entitled BICYCLE MOUNT DEVICE, which claims priority from U.S. Provisional Patent Application No. 62/045,210 filed Sep. 3, 2014, both of which are hereby incorporated by reference in their entirety.

FIELD OF THE INVENTION

The present invention is directed to a device which secures an object, such as a bicycle, for transport and repair. In particular, the invention is directed to a bicycle mount device which positions and maintains the bicycle in a level position.

BACKGROUND OF THE INVENTION

A bicycle car rack is a common means of transporting bicycles on a vehicle. Typically, such racks utilize the vehicle's existing trailer hitch receiver as an attachment point. Such known standard racks properly support a "man's" bike, with the horizontal cross bar from the seat post to the handlebar stem, providing safety and convenience for the rider. However, known racks do not properly support a "girl's" or "lady's" bike, which do not have the horizontal cross bar, but rather a double parallel tube design to provide the needed strength for the frame. Known racks also do not properly support "unisex" bikes, which not have a horizontal crossbar but a higher parallel tube design between the traditional "man's" and "lady's" styles. The design of the "lady's" and "unisex" bikes do not allow the bike to properly hang from the traditional bike rack which generally employs some sort of double hook arrangement.

As bicycles, other than the traditional "man's" bike, do not have horizontal cross bars, such bicycles can present safety issues when trying to carry them on known traditional vehicle mounted bike racks, which are primarily designed to engage such horizontal cross bars. Because such bicycles do not have the horizontal cross bars, the bicycles may be mounted off center to the vehicle, causing a tire to extend beyond the side of the vehicle. Consequently, the driver of such vehicle might misjudge clearance of the vehicle and bicycle, which could result in the bicycle being knocked off of the bike rack. In addition, a pedestrian or another vehicle could be hit by the bike, causing an accident or injury.

In addition, bicycles which do not have horizontal cross bars generally are mounted on known bike racks in a non-level position. Consequently, at least one wheel of the bicycle is positioned closer to the ground. In smaller vehicles, such as economy and sports cars, which have less height than other vehicles, the lack of ground clearance of the wheel can pose a safety concern, as the wheel might well be dragging on the road surface or at least not far from it.

It would, therefore, be beneficial to provide a bicycle mount which positions, secures and maintains a bicycle in a level position during transport. In addition, it would be beneficial to maintain the bicycle at a convenient height to ensure that the bicycle wheels are positioned safely above the ground for proper transport on the carrier.

SUMMARY OF THE INVENTION

An object is to provide a bicycle mount which cooperates and mounts to a seat positioning member of a bicycle. The bicycle mount allowing for any type of bicycle, whether the bicycle has high top tube or cross-bar (sometimes referred to as a "man's" bike), a low or absent top tube or cross-bar (sometimes referred to as a "lady's" bike) or modified top tube or cross-bar (sometimes referred to as a "unisex" bike or a "cross bike"), to be positioned and maintained on the bicycle rack in a height appropriate, level position. The installation and use of the bicycle mount being accomplished without the need of tooling.

An embodiment is directed to a device for mounting a bicycle, regardless of the positioning of the top cross-bar, to a bicycle rack, the device including a bicycle attachment member, a mounting member and a connection member. The bicycle attachment member is dimensioned to cooperate with a seat positioning member of the bicycle to secure the bicycle attachment member to the seat positioning member. The mounting member extends at an angle relative to the bicycle attachment member. The connection member connects the bicycle attachment member to the mounting member. Wherein the bicycle is maintained in level position on the bicycle rack during transport.

An embodiment is directed to a device for mounting a bicycle, regardless of the positioning of the top cross-bar, to a bicycle rack, the device including a bicycle attachment member, a mounting member and a connection member. The bicycle attachment member is dimensioned to cooperate with a seat positioning member of the bicycle to secure the bicycle attachment member to the seat positioning member. The mounting member extends at an angle relative to the bicycle attachment member. The connection member connects the bicycle attachment member to the mounting member. The mounting member is height adjustable relative to the bicycle, ensuring that wheels of the bicycle are safely above the ground for proper transport on the bicycle rack. The mounting member is adjustable relative to the bicycle attachment member to position the mounting member in a position in which the longitudinal axis of the mounting member is essentially parallel to a plane which extends between the axles of front and rear wheels of the bicycle, wherein the bicycle is maintained in level position on the bicycle rack during transport.

An embodiment is directed to a device for mounting a bicycle, regardless of the positioning of the top cross-bar, to a bicycle rack, the device including a bicycle attachment member, a mounting member and a connection member. The bicycle attachment member is dimensioned to cooperate with a seat positioning member of the bicycle to secure the bicycle attachment member to the seat positioning member. The mounting member extends at an angle relative to the bicycle attachment member. The connection member connects the bicycle attachment member to the mounting member. The mounting member is height adjustable relative to the bicycle, ensuring that wheels of the bicycle are safely above the ground for proper transport on the bicycle rack. The mounting member is adjustable relative to the bicycle attachment member to position the mounting member in a position in which the longitudinal axis of the mounting member is essentially parallel to a plane which extends between the axles of front and rear wheels of the bicycle. The bicycle attachment member is moveably connected to and mounted on the mounting member by the cooperation of the first mounting device positioned on the bicycle attachment member and the second mounting device positioned on the mounting member, wherein the bicycle is maintained in level position on the bicycle rack during transport.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
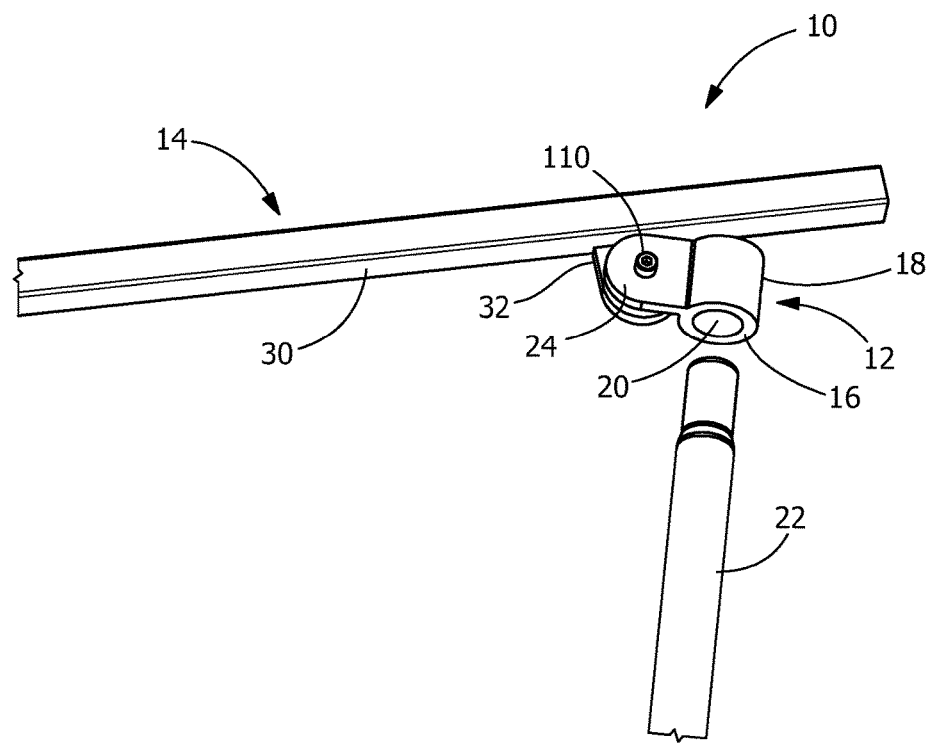
FIG. 1 is a perspective view of an illustrative bicycle mount prior to mounting to a seat post of a bicycle.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combination of features that may exist alone or in other combinations of features, the scope of the invention being defined by the claims appended hereto.

Figure 2:
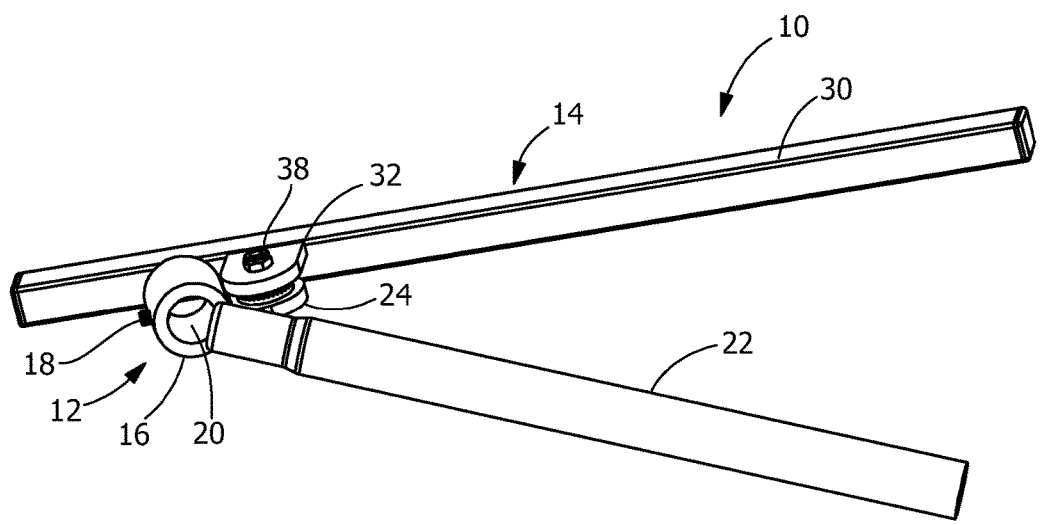
FIG. 2 is a perspective view of the bicycle mount of FIG. 1 shown mounted to the seat post of the bicycle.
Figure 3:
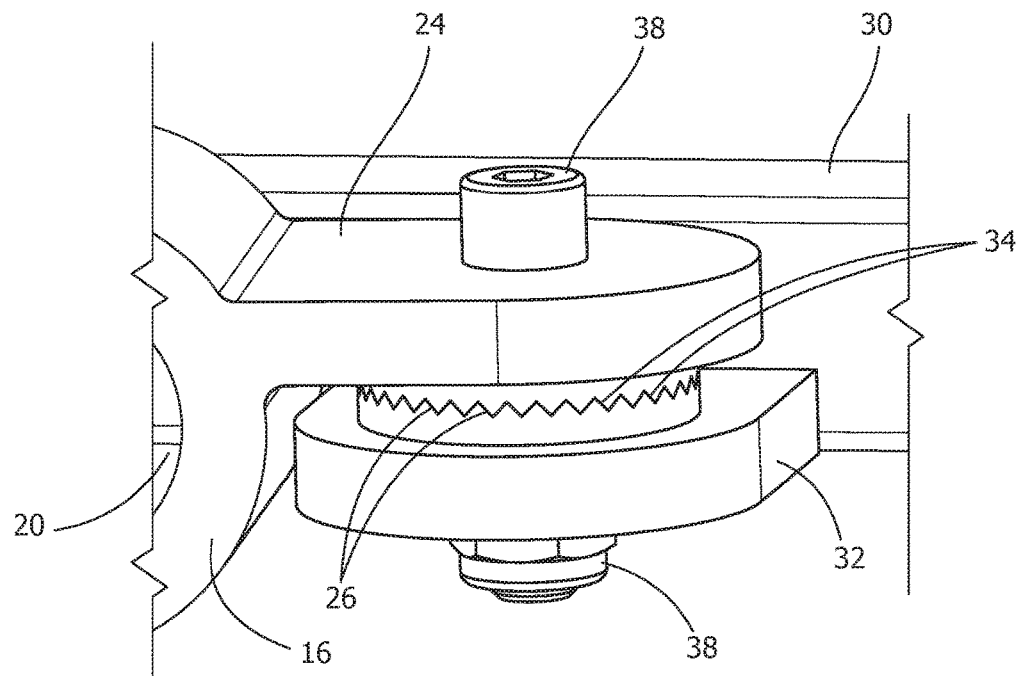
FIG. 3 is an enlarged perspective view of the mounting device of the bicycle mount of FIG. 1.
Figure 4:
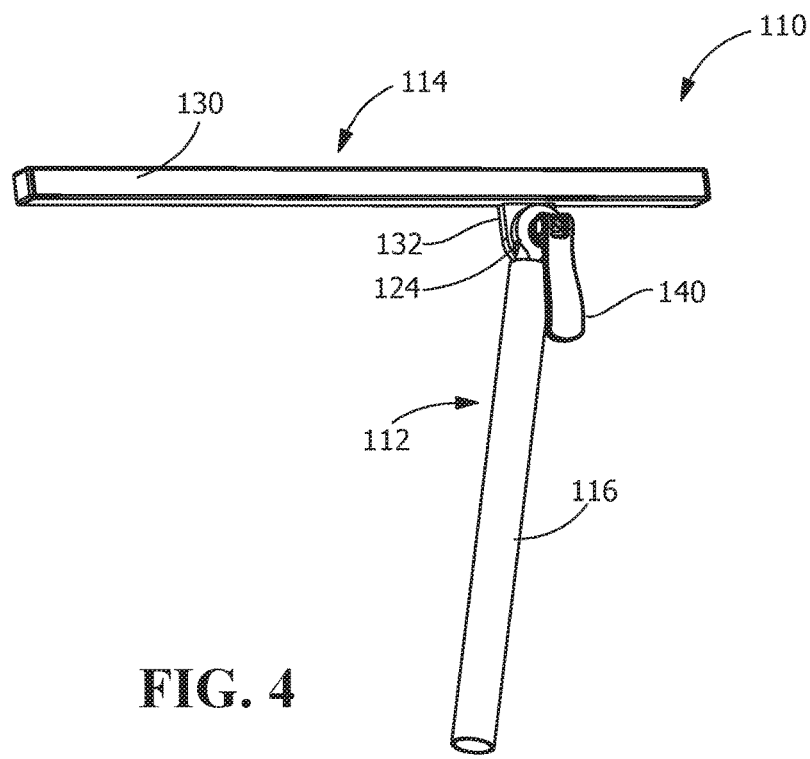
FIG. 4 is a perspective view of an alternate illustrative bicycle mount prior to mounting to a seat tube of a bicycle.
Figure 5:
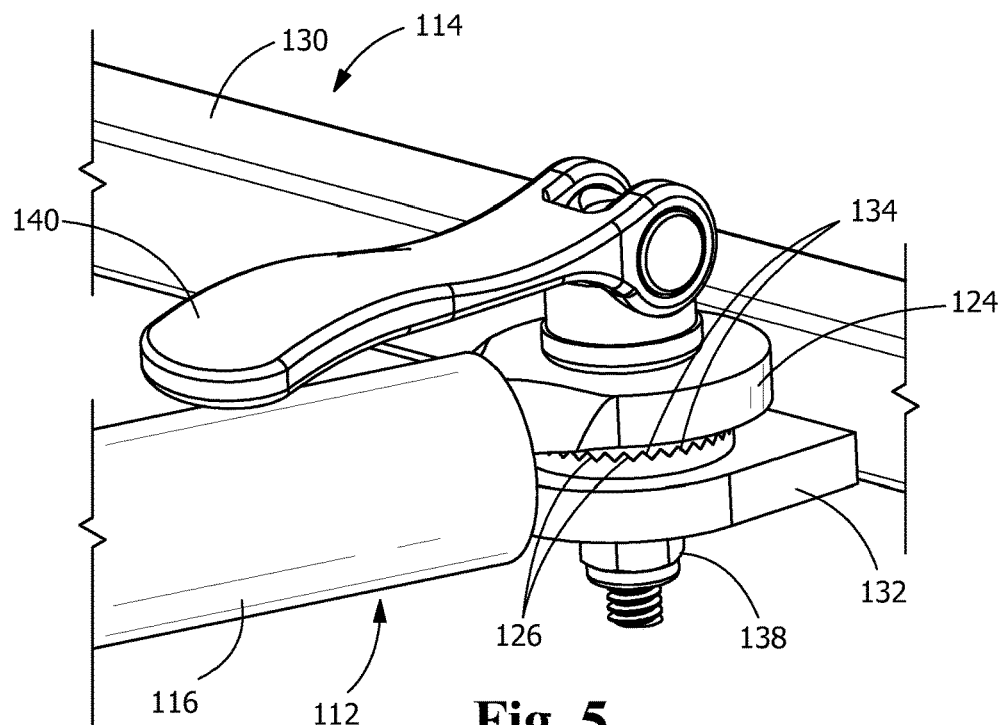
FIG. 5 is an enlarged front perspective view of the mounting device of the bicycle mount of FIG. 4.
Figure 6:
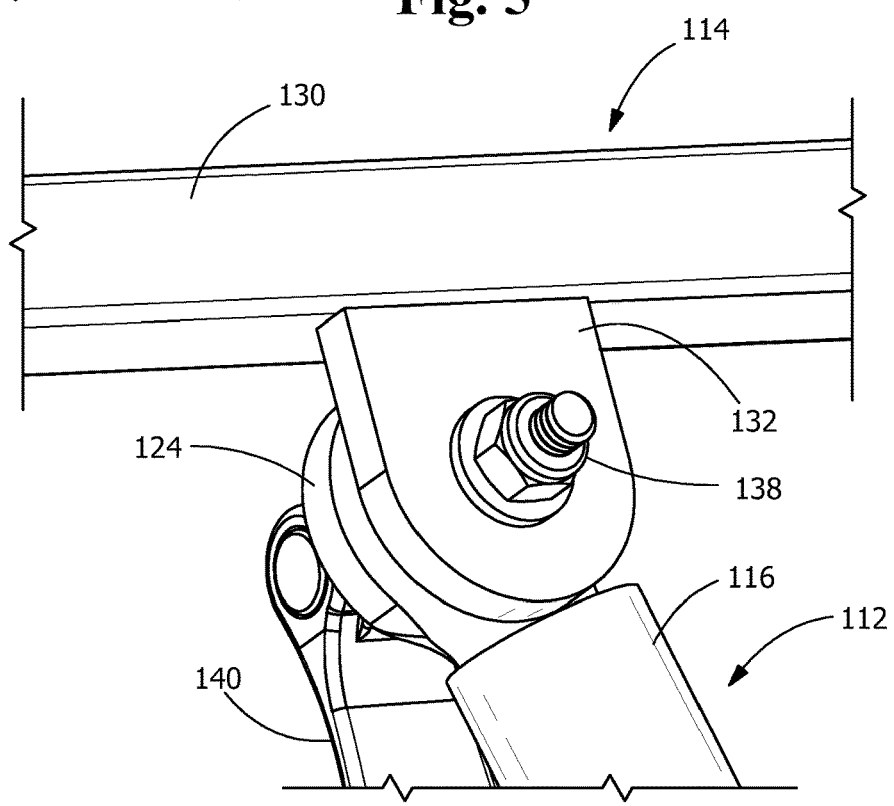
FIG. 6 is an enlarged back perspective view of the mounting device of the bicycle mount of FIG. 4.

As shown in FIGS. 1 through 3, an illustrative embodiment of the bicycle mount 10 has a bicycle attachment member 12 and a horizontal mounting member 14. The horizontal mounting member 14 is moveably mounted to the seat post retaining member 12 by a connection member 14. The bicycle mount is configured to be used with known bicycle car racks.

In the illustrative embodiment shown, the bicycle attachment member 12 has a cylindrical seat post retaining member 16 with an opening 20 extending therethrough. The opening 20 is dimensioned to receive a seat post 22 from a bicycle therein. In the embodiment shown, the opening 20 is dimensioned to receive a ⅞ inch diameter seat post, but the opening 20 can be configured to receive other diameter seat posts without departing from the scope of the invention. A set screw or other holding member 18 extends into the opening 20 to ensure that the seat post 22 is properly maintained the opening 20, as will be more fully described. While the seat post 22 in the figures is shown removed from the bicycle for ease of illustration, in use the seat post would be attached to the bicycle. The seat post retaining member 16 has a mounting device 24 which extends from the cylindrical seat post retaining member 16. The mounting device 24 has projections or serrations 26 (FIG. 3) which extend from one side thereof. A hardware receiving opening (not shown) extends through the mounting device 24.

The horizontal mounting member 14 has a mounting bar 30 and a mounting device 32 which is attached thereto. In the illustrative embodiment shown, the mounting bar 30 has a square cross section with the mounting device 32 extending from one side of the mounting bar 30, but other configurations can be used without departing from the scope of the invention. The mounting device 32 has projections or serrations 34 (FIG. 3) which extend from one side thereof. A hardware receiving opening (not shown) extends through the mounting device 32.

The bicycle attachment member 12 is moveably connected to and mounted on the horizontal mounting member 14 by the cooperation of the mounting device 24 and the mounting device 32. The serrations 26 of the mounting device 24 engage the serrations 34 of the mounting device 32 when the bicycle attachment member 12 is mounted on the horizontal mounting member 14. Mounting hardware 38 extends through the hardware receiving opening 28, 36 to maintain the mounting members 24, 32 in engagement. The angle provided between the longitudinal axis of the bicycle attachment member 12 and the longitudinal axis of the horizontal mounting member 14 may be adjusted or changed by loosening the hardware 38 and allowing the first serrations relative to be repositioned relative to the second serrations, allowing the mounting device 24 to move relative to the mounting device 32. Once the desired angle is reached, the serrations 26, 34 are moved together and interlock, and the hardware 38 is tightened to maintain the desired position of the horizontal mounting member 14 relative to the bicycle attachment member 12 and relative to the seat post 22. A camming lever (not shown) may be provided on the mounting hardware 32 to ensure that a proper force is maintained between the mounting members 24, 32 to retain the horizontal mounting member 14 in position relative to the bicycle attachment member 12. As the camming lever and mounting hardware 38 are known, a further explanation will not be provided.

In use, the seat (not shown) of a bicycle is removed to expose the end of the seat post 22. The cylindrical seat post retaining member 16 is moved into engagement and positioned on top of the seat post 22. As this occurs, the set screw 18 is moved to a location which allows the seat post 22 to be easily inserted into the opening 20 of the seat post retaining member 16. Once the seat post 22 is fully inserted into the opening 20, the set screw 18 is moved into the opening 20 and engages the seat post 22. The movement of the set screw 18 is continued until the set screw 18 is positioned against the seat post 22 with sufficient force to retain the set post 22 in position relative to the seat post retaining member 16 of the bicycle retention member 12.

With the seat post retaining member 16 of the bicycle retention member 12 properly positioned in the seat post 22, the horizontal mounting member 14 is adjusted relative to the seat post retaining member 16 to position the horizontal mounting member 14 in a position in which the longitudinal axis of the horizontal mounting member 14 is essentially parallel to a plane which extends between the axles of the front and rear wheels of the bicycle. With the horizontal mounting member 14 properly positioned, the mounting hardware is then tightened to move the mounting members 24, 32 into tight engagement, in which the cooperation of the serrations 26, 34 prevent the unwanted movement of the horizontal mounting member 14 relative to the bicycle attachment member 12.

With the bicycle attachment member 12 properly retained on the seat post 22 of the bicycle and the horizontal mounting member 14 properly positioned relative to the bicycle attachment member 12, the bicycle can be properly and safely positioned on a bicycle rack, whether the bicycle rack is a trunk mounted rack, a bumper mounted rack or a hitch mounted rack.

In addition, as the seat post 22 can be height adjusted, the horizontal mounting member 14 of the bicycle mount 10 can be height adjusted relative to the bicycle, ensuring that the wheels of the bicycle are safely above the ground for proper transport on the carrier or bicycle rack.

As the bicycle mount 10 cooperates and mounts to the seat post, the bicycle mount 10 allows for any type of bicycle, whether the bicycle has high top tube or cross-bar (sometimes referred to as a "man's" bike), a low or absent top tube or cross-bar (sometimes referred to as a "lady's" bike) or modified top tube or cross-bar (sometimes referred to as a "unisex" bike or a "cross bike"), to be positioned and maintained on the bicycle rack in a height appropriate, level position. The installation and use of the bicycle mount 10 is accomplished without the need of tooling.

As the seat of the bicycle is removed prior to transport, the user can keep his or her expensive seat out of the weather when transporting the bicycle.

FIGS. 3 through 5 and FIG. 10 are illustrative alternate embodiments of the bicycle mount 110. The bicycle mount 110 has a bicycle attachment member 112 and a horizontal mounting member 114. The horizontal mounting member 114 is moveably mounted to the seat post retaining member 112 by a connection member 114. The bicycle mount 110 is configured to be used with known bicycle car racks 50.

Figure 10:
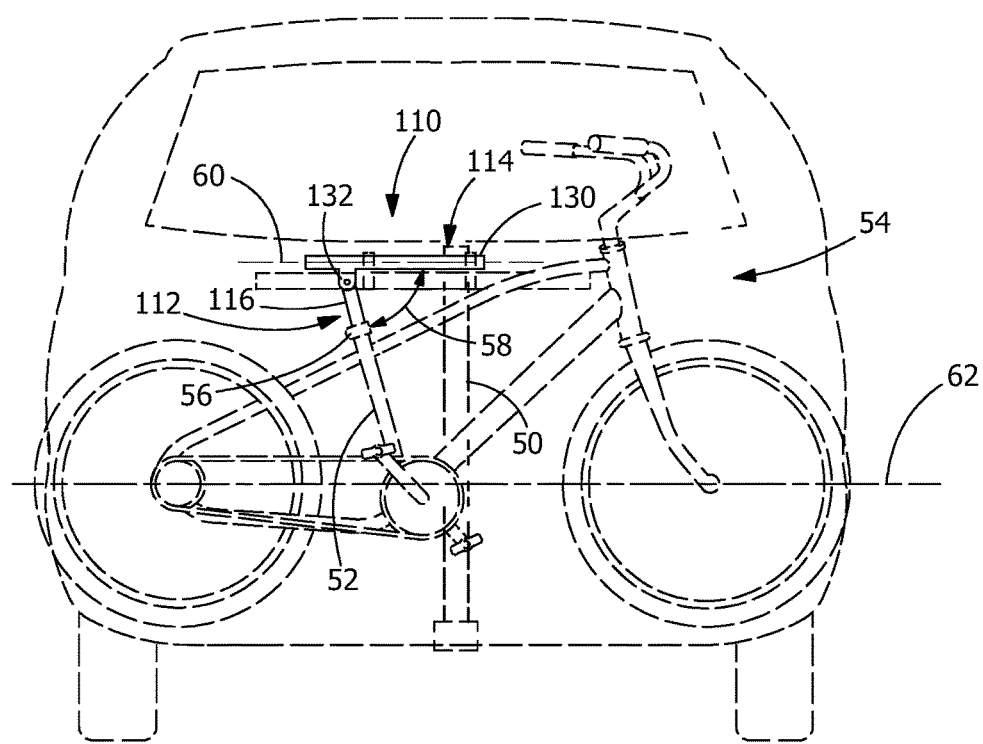
FIG. 10 is an elevation view of the bicycle mount of FIG. 4 secured to a bicycle, with the bicycle mount and bicycle positioned on a hitch mounted bicycle car rack.

In the illustrative embodiment shown, the bicycle attachment member 112 has a cylindrical post 116. The cylindrical post 116 is dimensioned to be received in a seat post receiving member or seat tube 52 of a bicycle 54, as best shown in FIG. 10. In the embodiment shown, the cylindrical post 116 is dimensioned to have a similar diameter to the seat post of the respective bicycle. Such diameters include, but are not limited to ⅞ inches, 25.4 mm, and 27.2 mm. Shims (not shown) may also be included to facilitate the receipt of the cylindrical post 116 in the seat tube 52. An existing column fastener 56 of the bicycle 54 may be used to secure the cylindrical post 116 to the seat tube 52. Alternatively, other securing hardware, such as, but not limited to, a cam lock or nut/bold combination may be used. The post 116 has a mounting device 124 which extends from the post 116. The mounting device 124 has projections or serrations 126 which extend from one side thereof. A hardware receiving opening (not shown) extends through the mounting device 124.

The horizontal mounting member 114 has a mounting bar 130 and a mounting device 132 which is attached thereto. In the illustrative embodiment shown, the horizontal mounting member 114 has a square cross section with the mounting device 132 extending from one side of the mounting bar 130, but other configurations can be used without departing from the scope of the invention. The mounting device 132 has projections or serrations 134 which extend from one side thereof. A hardware receiving opening (not shown) extends through the mounting device 132.

The bicycle attachment member 112 is moveably connected to and mounted on the horizontal mounting member 114 by the cooperation of the mounting device 124 and the mounting device 132. The serrations 126 of the mounting device 124 engage the serrations 134 of the mounting device 132 when the bicycle attachment member 112 is mounted on the horizontal mounting member 114. Mounting hardware 138 extends through the hardware receiving opening 128, 136 to maintain the mounting members 124, 132 in engagement. The angle 58 provided between the longitudinal axis of the bicycle attachment member 112 and the longitudinal axis of the horizontal mounting member 114 may be adjusted or changed by loosening the hardware 138 and allowing the mounting device 124 to move relative to the mounting device 132. Once the desired angle is reached, the serrations 126, 134 are moved together and interlock and the hardware 138 is tightened to maintain the desired position of the horizontal mounting member 114 relative to the bicycle attachment member 112. A camming lever 140 may be provided on the mounting hardware 132 to ensure that a proper force is maintained between the mounting members 124, 132 to retain the horizontal mounting member 114 in position relative to the bicycle attachment member 112. As the camming lever 140 and mounting hardware 138 are known, a further explanation will not be provided.

In use, the seat and seat post (not shown) of a bicycle are removed to expose the end of the seat tube 122. The cylindrical post 116 is moved into engagement and positioned in the seat tube 122. Once the post 116 is fully inserted into the seat tube 122, the fastener 118 is tightened. The post 116 is maintained in seat tube 122 with sufficient force to retain the post 116 in position relative to the seat tube 122 of the bicycle retention member 112.

With the seat post retaining member 116 of the bicycle retention member 112 properly positioned in the seat tube 52, the horizontal mounting member 114 is adjusted relative to the seat post retaining member 116 to position the horizontal mounting member 114 in a position in which the longitudinal axis 60 of the horizontal mounting member 114 is essentially parallel to a plane 62 which extends between the axles of the front and rear wheels of the bicycle. With the horizontal mounting member 114 properly positioned, the mounting hardware is then tightened to move the mounting members 124, 132 into tight engagement, in which the cooperation of the serrations 126, 134 prevent the unwanted movement of the horizontal mounting member 114 relative to the bicycle attachment member 112.

Figure 11:
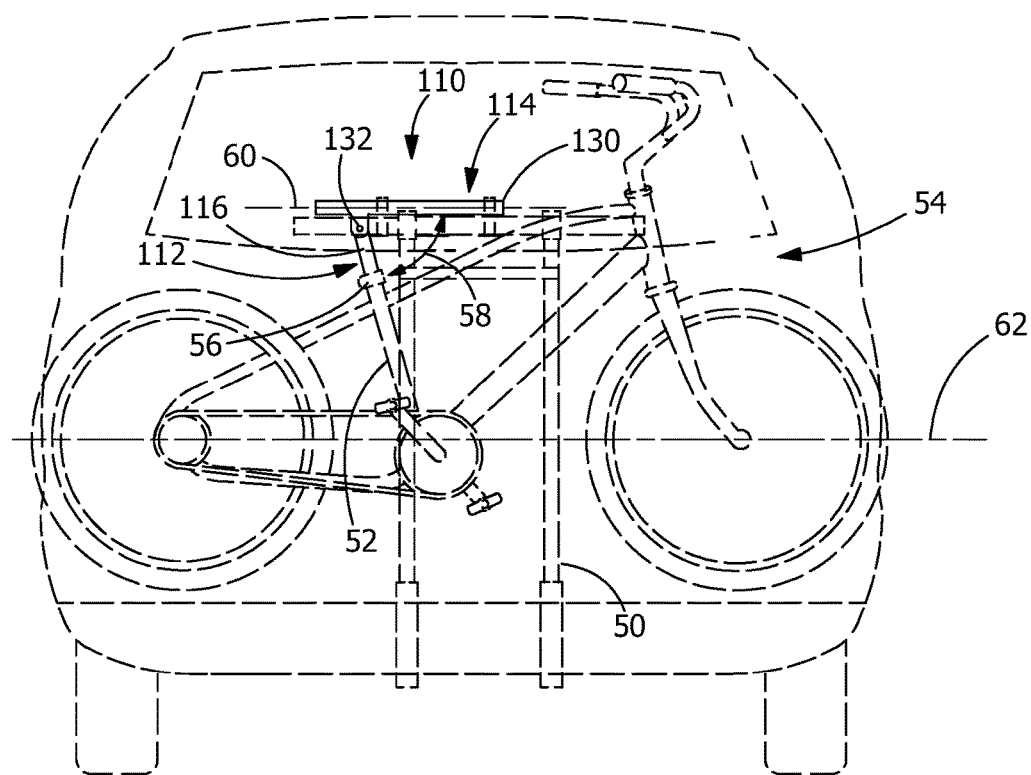
FIG. 11 is an elevation view of the bicycle mount of FIG. 4 secured to a bicycle, with the bicycle mount and bicycle positioned on a bumper mounted bicycle car rack.
Figure 12:
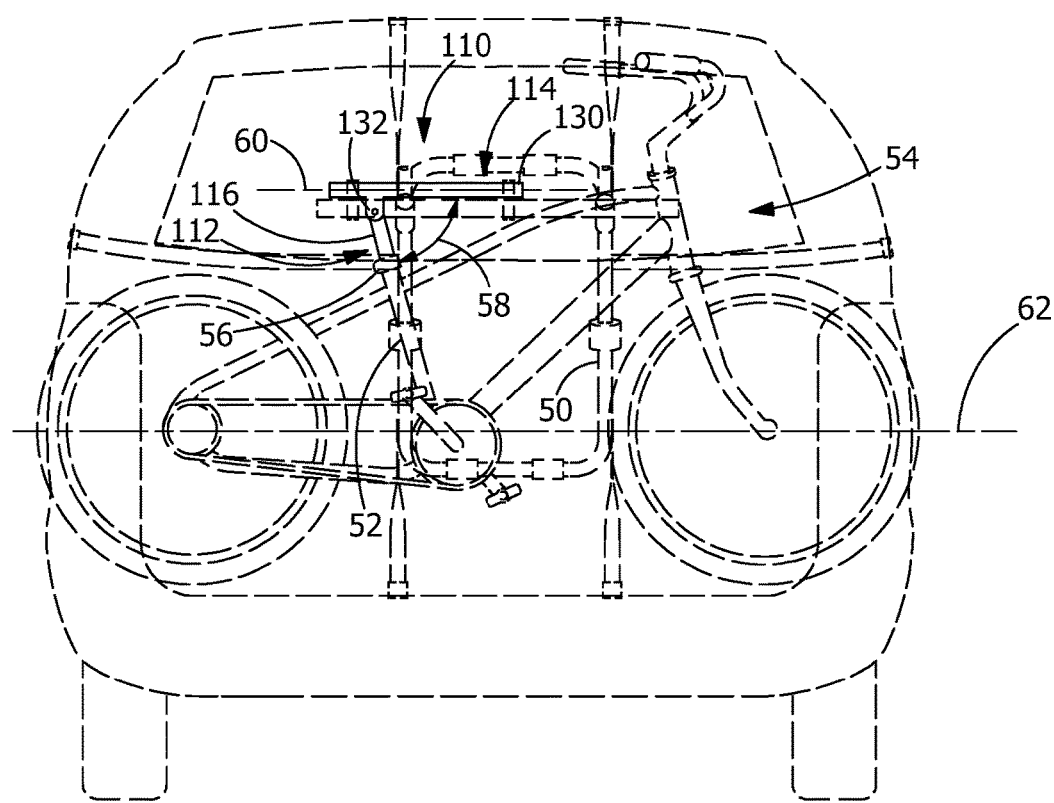
FIG. 12 is an elevation view of the bicycle mount of FIG. 4 secured to a bicycle, with the bicycle mount and bicycle positioned on a trunk mounted bicycle car rack.

With the bicycle attachment member 112 properly retained in the seat tube 122 of the bicycle and the horizontal mounting member 114 properly positioned relative to the bicycle attachment member 112, the bicycle can be properly and safely positioned on a bicycle hang rack, whether the bicycle hang rack is a trunk mounted bicycle hang rack (FIG. 12), a bumper mounted bicycle hang rack (FIG. 11) or a hitch mounted bicycle hang rack (FIG. 10).

In addition, as the post 116 can be height adjusted relative to the seat tube 122, the horizontal mounting member 114 of the bicycle mount 110 can be height adjusted to ensure bicycle wheels were safely above the ground for proper transport on the carrier. For a small vehicle, the post 116 can be inserted almost totally into the seat tube 122. For a larger vehicle, the post 116 the height can be adjusted to the convenience of the user.

As the bicycle mount 110 cooperates and mounts to the seat post, the bicycle mount 110 allows for any type of bicycle, whether the bicycle has high top tube or cross-bar (sometimes referred to as a "man's" bike), a low or absent top tube or cross-bar (sometimes referred to as a "lady's" bike) or modified top tube or cross-bar (sometimes referred to as a "unisex" bike or a "cross bike"), to be positioned and maintained on the bicycle rack in a height appropriate, level position. The installation and use of the bicycle mount 110 is accomplished without the need of tooling.

In addition to the bicycle mount 110 being configured to allow the bicycle to hang correctly from the rack, the bicycle mount 110 may act as a temporary work stand to hold the bicycle in a wheels up position, as previously described.

Figure 9:
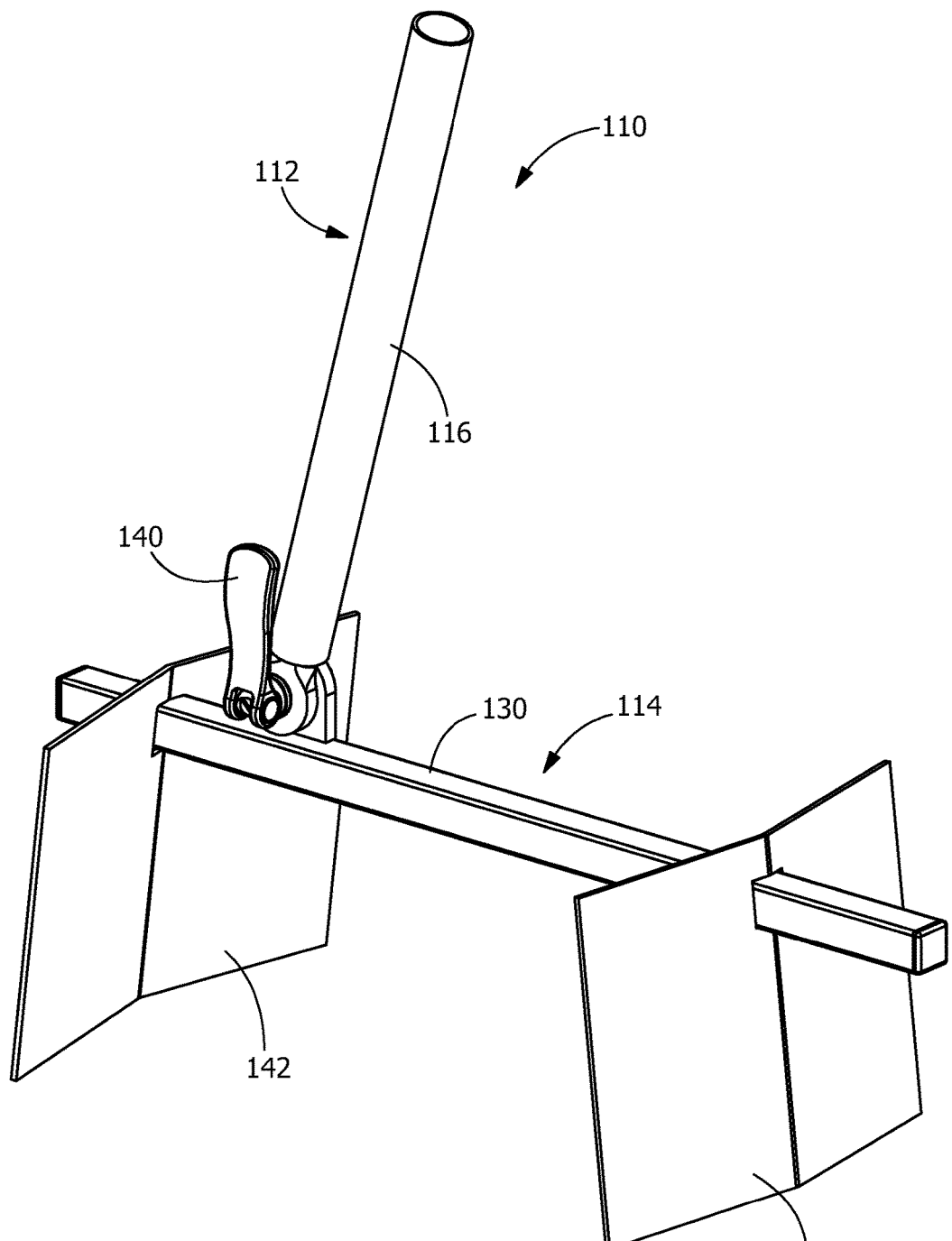
FIG. 9 is a perspective view of the bicycle mount of FIG. 4 used as a temporary stand for an inverted bicycle.

In addition to the bicycle mount 110 being configured to allow the bicycle to hang correctly from the rack, the bicycle mount 110 may act as a temporary work stand to hold the bicycle in a wheels up position, as shown in FIG. 9. In the illustrative embodiment shown, this is accomplished by using one or two stabilization attachments 142, which, when slid onto the horizontal mounting member 114 of the bicycle mount 110 allows the bicycle to stand vertically with the wheels up. The stabilization attachments 142 may be rectangular, triangular or any other shape that provided appropriate support. The stabilization attachments 142 may be made of materials having the appropriate strength characteristics, including, but not limited to, steel, aluminum or fiberglass.

Figure 7:
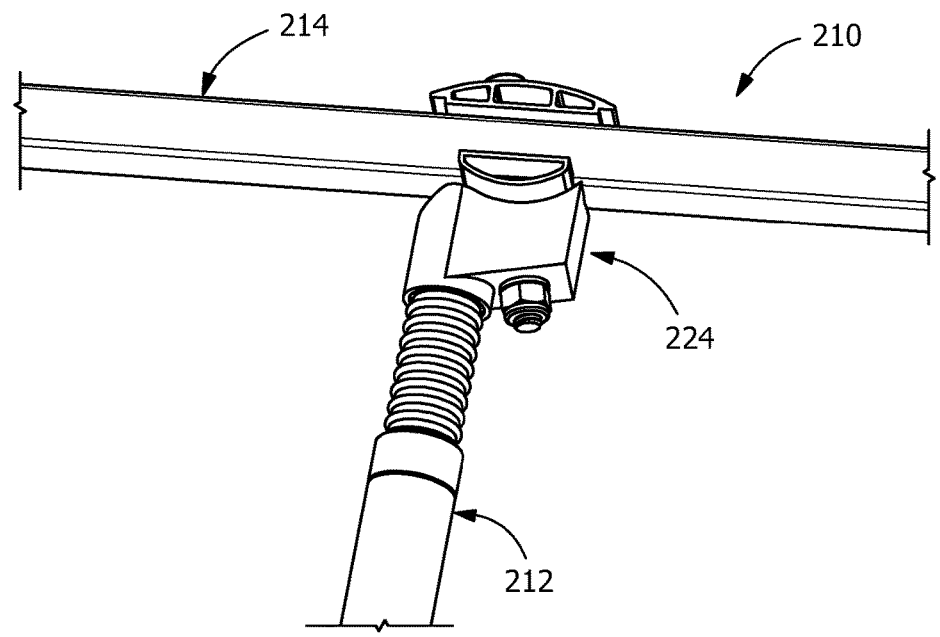
FIG. 7 is a perspective view of a second alternate illustrative bicycle mount prior to mounting to a seat tube of a bicycle.
Figure 8:
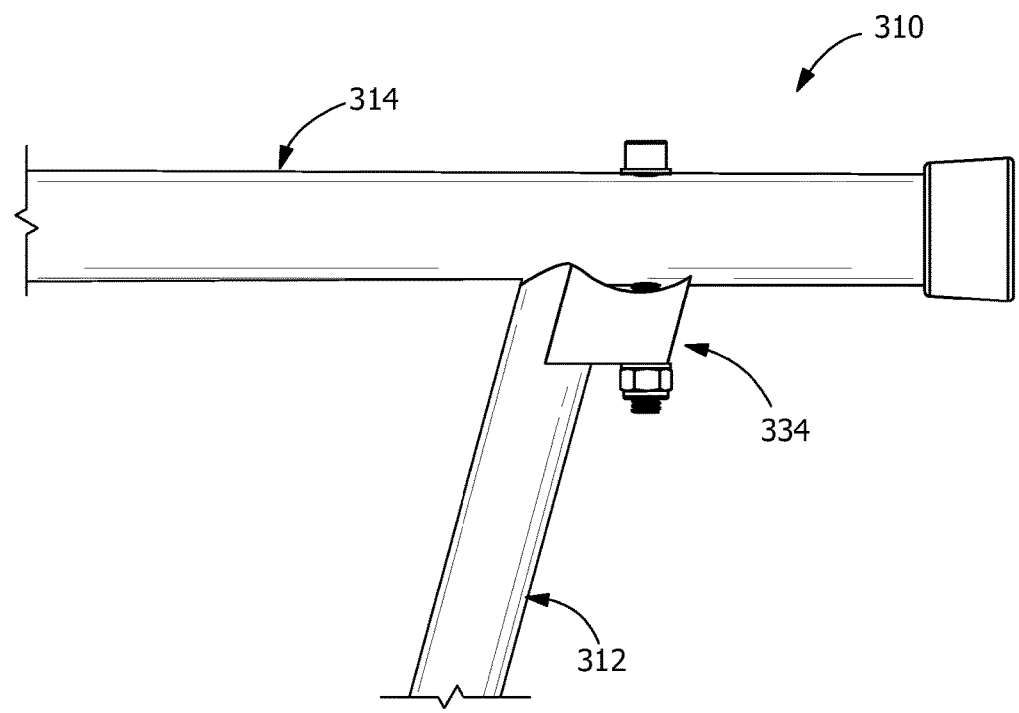
FIG. 8 is a perspective view of a third alternate illustrative bicycle mount prior to mounting to a seat tube of a bicycle.

Other embodiments of the bicycle mount and other mounting members may be used without departing from the scope of the invention. For example, FIG. 7 illustrates an alternative bicycle mount 210 in which a different mounting member 224 connects the bicycle attachment member 212 to the horizontal mounting member 214. In this embodiment, the bicycle attachment member 212 is moveable relative to the horizontal mounting member 214. FIG. 8 illustrates an alternative bicycle mount 310 in which a different mounting device 324 connects the bicycle attachment member 312 to the horizontal mounting member 314. In this embodiment, the bicycle attachment member 312 is fixed relative to the horizontal mounting member 314.

In an alternate embodiment not shown, the bicycle attachment member and the horizontal mounting member include either radial grooves or radial projections (between the grooves) which extend from or proximate to a hardware receiving opening hole. The radial grooves of a respective member align with the radial projections of the other member, whereby as the hardware is tightened, the radial grooves of the seat the one member interlock with the radial projections of the other member, maintaining the desired angle between the bicycle attachment member and the horizontal mounting member without the need of set screws. In another embodiment, a series of precisely and variably spaced holes both the mounting member and the attachment member may be used to provide the angular adjustment.

Bicycles typically weigh anywhere from approximately 15 pounds to approximately 40 pounds. However, heavier bikes, of approximately 60 or more pounds, are known. The bicycle mounts 10 as shown and described herein are configured to accommodate most bicycle, regardless of weight.

While the invention has been described with reference to a preferred embodiment, it will be understood by those skilled in the art that various changes may be made and equivalents may be substituted for elements thereof without departing from the spirit and scope of the invention of the invention as defined in the accompanying claims. In particular, it will be clear to those skilled in the art that the present invention may be embodied in other specific forms, structures, arrangements, proportions, sizes, and with other elements, materials, and components, without departing from the spirit or essential characteristics thereof. One skilled in the art will appreciate that the invention may be used with many modifications of structure, arrangement, proportions, sizes, materials and components and otherwise used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims, and not limited to the foregoing description or embodiments.

The invention claimed is:

1. A device for mounting a bicycle, regardless of the positioning of a top cross-bar of the bicycle, to a trunk mounted bicycle hang rack, a bumper mounted bicycle hang rack or a hitch mounted bicycle hang rack, the device comprising:

a bicycle attachment member, the bicycle attachment member dimensioned to cooperate with a seat positioning member of the bicycle to secure the bicycle attachment member to the seat positioning member;

a mounting member, the mounting member adjustably mounted to the bicycle attachment member at an angle relative to the bicycle attachment member;

the bicycle attachment member is movably mounted to the seat positioning member and is height adjustable relative to the bicycle to allow the height of the mounting member to be adjusted relative to the wheels of the bicycle and to allow the wheels of the bicycle to be positioned above the ground for proper transport on the trunk mounted bicycle hang rack, the bumper mounted bicycle hang rack or the hitch mounted bicycle hang rack;

the mounting member is adjustable relative to the bicycle attachment member to position the longitudinal axis of the mounting member parallel to the ground and parallel to the plane extending between the axle of the front wheel and the axle of the rear wheel; a mounting device extending between the mounting member and the bicycle attachment member, the mounting device configured to retain the longitudinal axis of the mounting member parallel to the ground and parallel to the plane extending between the axle of the front wheel and the axle of the rear wheel, the mounting member configured to fully support the weight of the bicycle with no additional support and maintain the bicycle in level position on the trunk mounted bicycle hang rack, the bumper mounted bicycle hang rack or the hitch mounted bicycle hang rack with the wheels suspended from the ground during transport with no additional support.

2. The device for mounting a bicycle to a bicycle hang rack as recited in claim 1, wherein the bicycle attachment member has a cylindrical seat post retaining member with an opening extending therethrough, the opening dimensioned to receive a seat post from the bicycle therein.

3. The device for mounting a bicycle to a bicycle hang rack as recited in claim 2, wherein a holding member extends into the opening to ensure that the seat post is properly maintained the opening.

4. The device for mounting a bicycle to a bicycle hang rack as recited in claim 2, wherein the cylindrical seat post retaining member has the mounting device which extends from the cylindrical seat post retaining member.

5. The device for mounting a bicycle to a bicycle hang rack as recited in claim 4, wherein the mounting device has projections which extend from one side thereof.

6. The device for mounting a bicycle to a bicycle hang rack as recited in claim 1, wherein the mounting member has a mounting bar which is attached thereto.

7. The device for mounting a bicycle to a bicycle hang rack as recited in claim 6, wherein the mounting bar has a square cross section with the mounting device extending from one side of the mounting bar.

8. The device for mounting a bicycle to a bicycle hang rack as recited in claim 6, wherein the mounting device has projections which extend from one side thereof.

9. The device for mounting a bicycle to a bicycle hang rack as recited in claim 1, wherein the bicycle attachment member is moveably connected to and mounted on the mounting member by the cooperation of a first portion of the mounting device positioned on the bicycle attachment member and a second portion of the mounting device positioned on the mounting member.

10. The device for mounting a bicycle to a bicycle hang rack as recited in claim 9, wherein first serrations of the first portion of the mounting device engage second serrations of the second portion of the mounting device when the bicycle attachment member is mounted on the mounting member, wherein the angle provided between a longitudinal axis of the bicycle attachment member and a longitudinal axis of the mounting member may be adjusted or changed by repositioning the first serrations relative to the second serrations.

11. The device for mounting a bicycle to a bicycle hang rack as recited in claim 1, wherein the bicycle attachment member has a cylindrical post which is dimensioned to be received in a seat post receiving member of the bicycle.

12. A device for mounting a bicycle, regardless of the positioning of a top cross-bar of the bicycle, to a bicycle hang rack, the device comprising:
a bicycle attachment member, the bicycle attachment member dimensioned to cooperate with a seat positioning member of the bicycle to secure the bicycle attachment member to the seat positioning member; the bicycle attachment member is movably mounted to the seat positioning member and is height adjustable relative to the bicycle to allow the height of the mounting member to be adjusted relative to the wheels of the bicycle and to allow the wheels of the bicycle to be positioned above the ground for proper transport on the trunk mounted bicycle hang rack;
a mounting member, the mounting member adjustably mounted to the bicycle attachment member at an angle relative to the bicycle attachment member;
a connection member connecting the bicycle attachment member to the mounting member;
the mounting member is height adjustable relative to the bicycle, ensuring that wheels of the bicycle are safely above the ground for proper transport on the bicycle hang rack;
the mounting member is adjustable relative to the bicycle attachment member to position the longitudinal axis of the mounting member essentially parallel to the ground and parallel to the plane extending between the axles of the front and rear wheels, the connection member configured to retain the longitudinal axis of the mounting member parallel to the ground and parallel to the plane extending between the axle of the front wheel and the axle of the rear wheel, the mounting member configured to fully support the weight of the bicycle with no additional support and to maintain the bicycle in level position on a trunk mounted bicycle hang rack, a bumper mounted bicycle hang rack or a hitch mounted bicycle hang rack with the wheels suspended from the ground during transport with no additional support.

13. The device for mounting a bicycle to a bicycle hang rack as recited in claim 12, wherein the bicycle attachment member has a cylindrical seat post retaining member with an opening extending therethrough, the opening dimensioned to receive a seat post from the bicycle therein.

14. The device for mounting a bicycle to a bicycle hang rack as recited in claim 12, wherein the bicycle attachment member has a cylindrical post which is dimensioned to be received in a seat post receiving member of the bicycle.

15. The device for mounting a bicycle to a bicycle hang rack as recited in claim 12, wherein the mounting member has a mounting bar and a mounting device of the connection member which is attached thereto.

16. The device for mounting a bicycle to a bicycle hang rack as recited in claim 12, wherein the bicycle attachment member is moveably connected to and mounted on the mounting member by the cooperation of a first mounting device of the connection member positioned on the bicycle attachment member and a second mounting device of the connection member positioned on the mounting member.

17. A device for mounting a bicycle, regardless of the positioning of a top cross-bar of the bicycle, to a bicycle hang rack, the device comprising:
a bicycle attachment member, the bicycle attachment member dimensioned to cooperate with a seat positioning member of the bicycle to secure the bicycle attachment member to the seat positioning member;
a mounting member, the mounting member adjustably mounted to the bicycle attachment member at an angle relative to the bicycle attachment member;
a moveable connection member having a first mounting device and a second mounting device, the moveable connection member connects the bicycle attachment member to the mounting member;
the bicycle attachment member is movably mounted to the seat positioning member and is height adjustable relative to the bicycle to allow the height of the mounting member to be adjusted relative to the wheels of the bicycle and to allow the wheels of the bicycle to be positioned above the ground for proper transport on a trunk mounted bicycle hang rack, a bumper mounted bicycle hang rack or a hitch mounted bicycle hang rack;
the mounting member is adjustable relative to the bicycle attachment member to position the mounting member in a position in which a longitudinal axis of the mounting member is essentially parallel to the ground and parallel to a plane which extends between the axles of front and rear wheels of the bicycle;

the bicycle attachment member is moveably connected to and mounted on the mounting member by the cooperation of the first mounting device positioned on the bicycle attachment member and the second mounting device positioned on the mounting member;

the movable connection member configured to retain the longitudinal axis of the mounting member parallel to the ground and parallel to the plane extending between the axle of the front wheel and the axle of the rear wheel, the mounting member configured to fully support the weight of the bicycle with no additional support and to maintain the bicycle in level position on the trunk mounted bicycle hang rack, the bumper mounted bicycle hang rack or the hitch mounted bicycle hang rack with the wheels suspended from the ground during transport with no additional support.

* * * * *